United States Patent
Fukano et al.

[11] Patent Number: 5,996,636
[45] Date of Patent: Dec. 7, 1999

[54] TUBE JOINT

[75] Inventors: Yoshihiro Fukano; Tetsuro Maruyama, both of Ibaraki-ken, Japan

[73] Assignee: SMC Kabushiki Kaisha, Tokyo, Japan

[21] Appl. No.: 08/995,014

[22] Filed: Dec. 19, 1997

[30] Foreign Application Priority Data

Jan. 24, 1997 [JP] Japan ..................................... 9-011708
Nov. 14, 1997 [JP] Japan ..................................... 9-313298

[51] Int. Cl.⁶ .................................................. F16L 11/00
[52] U.S. Cl. ......................... 138/109; 138/120; 285/354; 285/370; 277/615
[58] Field of Search ..................................... 138/109, 120, 138/108, 112; 285/354, 370; 277/602, 615

[56] References Cited

U.S. PATENT DOCUMENTS

| | | | |
|---|---|---|---|
| 1,974,383 | 9/1934 | Wallace | 138/135 |
| 3,228,096 | 1/1966 | Albro | 138/109 |
| 3,606,659 | 9/1971 | Robbins | 138/109 |
| 3,782,419 | 1/1974 | Hanson | 138/109 |
| 3,977,439 | 8/1976 | Lambert | 138/114 |
| 4,242,164 | 12/1980 | Skinner | 277/615 |
| 4,691,740 | 9/1987 | Svetlik et al. | 138/109 |
| 5,255,974 | 10/1993 | Signer | 138/108 |
| 5,645,301 | 7/1997 | Kingsford et al. | 285/354 |
| 5,782,270 | 7/1998 | Goett et al. | 138/109 |

FOREIGN PATENT DOCUMENTS 7-20471 5/1995 Japan.

*Primary Examiner*—James F. Hook
*Attorney, Agent, or Firm*—Oblon, Spivak, McClelland, Maier & Neustadt, P.C.

[57] ABSTRACT

A tube joint includes a joint body having a through hole to serve as a fluid passage provided along a direction of an axis, a nut member for connecting a tube to the joint body, and an insert bush inserted and fitted to an opening of the joint body and having an insert section to be inserted into the tube and an expanded section protruding from one end of the tube. The expanded section is formed with first projections which make linear contact with an inner wall surface of the opening and which function as seals.

7 Claims, 7 Drawing Sheets

TUBE JOINT

BACKGROUND OF THE INVENTION

1. Field of the Invention

The present invention relates to a tube joint which makes it possible to connect, for example, a tube member such as a tube to a fluid pressure apparatus in a liquid-tight manner or in an air-tight manner.

2. Description of the Related Art

A tube joint concerning a conventional technique (see, for example, Japanese Utility Model Publication No. 7-20471) is shown in FIG. 8.

The tube joint 1 comprises an inner ring 3 for being pressed and inserted into one end of a tube member 2 so that the inner ring 3 protrudes from the one end of the tube member 2 to increase the diameter of the tube member 2 at the one end, and a main joint body 5 having a socket 4 formed at one end thereof for inserting a plug portion of the tube member 2 into which the inner ring 3 has been pressed and inserted. An external thread 6 is threaded over an outer circumference portion of the main joint body 5. A press ring 8 is externally fitted to the one end of the main joint body 5 through an internal thread 7 which engages with the external thread 6.

In this case, a seal section 9 is provided at a deep portion of the socket 4. The seal section 9 is formed to cross an axial direction of the socket 4 so that a seal section disposed at an inner end of the inner ring 3 protruding from the one end of the tube member 2 is allowed to abut against the deep portion of the socket 4. The sealing performance is secured by the aid of the seal section 9.

However, the seal section 9 of the tube joint 1 concerning the conventional technique involves the following inconvenience. That is, the seal is effected in a state in which the seal section disposed at the inner end of the inner ring 3 makes surface-to-surface contact with the deep portion of the socket 4. Therefore, the force (pressure) for pressing the seal surface, i.e., the surface pressure exerted on the seal surface tends to be lowered, resulting in a decrease in sealing performance.

SUMMARY OF THE INVENTION

A general object of the present invention is to provide a tube joint which makes it possible to increase the surface pressure per unit area exerted on the seal surface so that the sealing performance is improved more reliably.

The above and other objects, features, and advantages of the present invention will become more apparent from the following description when taken in conjunction with the accompanying drawings in which a preferred embodiment of the present invention is shown by way of a illustrative example.

DESCRIPTION OF THE PREFERRED EMBODIMENTS

Figure 1:
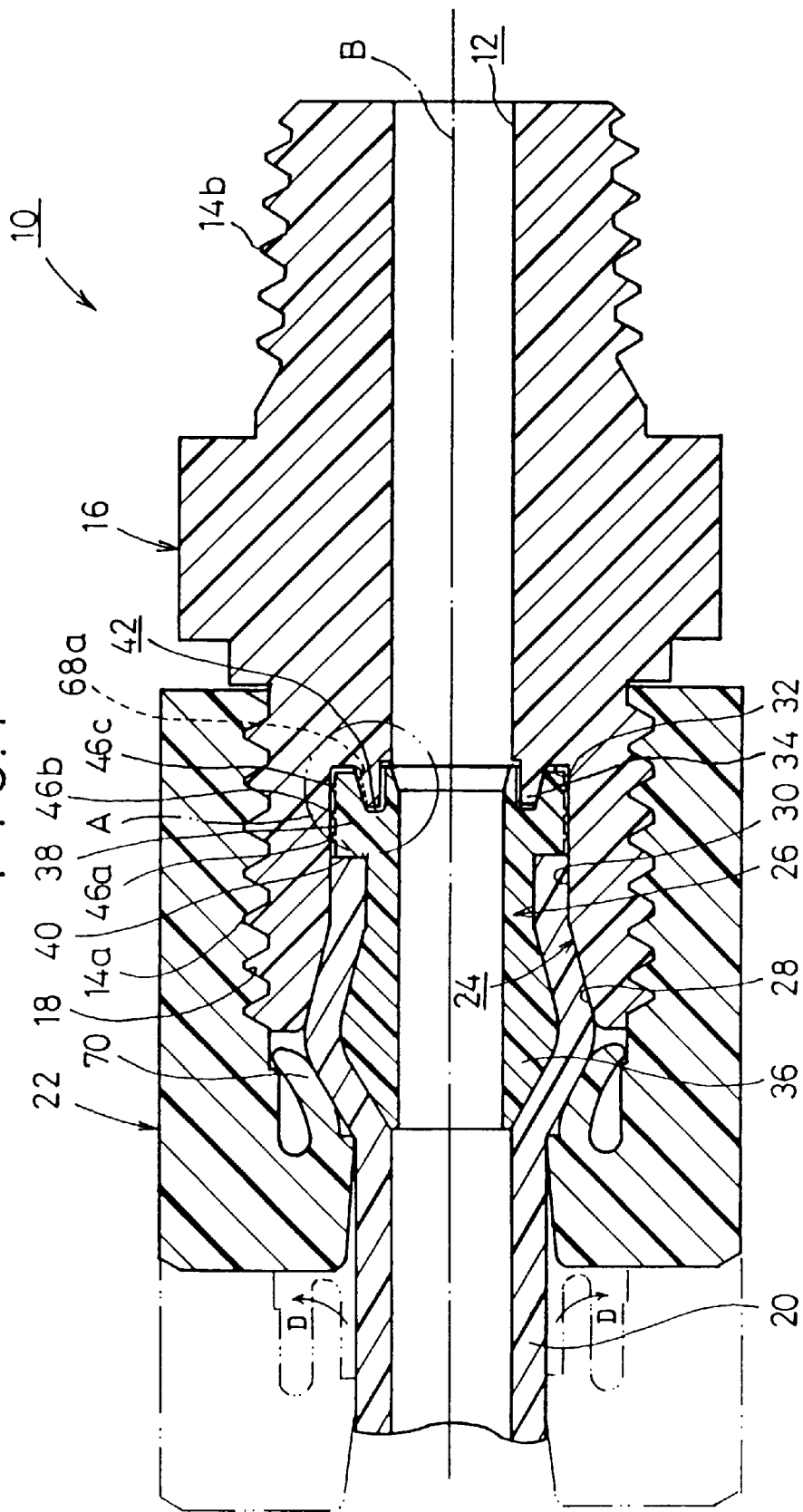
FIG. 1 shows a vertical cross-sectional view taken along an axial direction of a tube joint according to an embodiment of the present invention.

In FIG. 1, a tube joint 10 is shown according to an embodiment of the present invention.

The tube joint 10 comprises a cylindrical joint body 16 and a nut member 22. The joint body 16 includes a through hole 12 formed along a direction of an axis B to function as a fluid passage, and first and second external threads 14a, 14b threaded over outer circumferential surface portions at both ends. The nut member 22 holds a tube (tube member) 20 on the joint body 16 by engaging an internal thread 18 threaded over an inner circumferential surface with the first external thread 14a so that the nut member 22 is fitted to one end of the joint body 16.

An insert bush (insert member) 26, which is in a state in which a part thereof protrudes from the one end of the tube 20, is inserted and fitted to an opening 24 of the joint body 16 over which the first external thread 14a is threaded. The opening 24 of the joint body 16 comprises a tapered surface 28 which starts from one end and which has its gradually reducing diameter, a cylindrical surface 30 which continues from the tapered surface 28 and which is formed to have a substantially identical or constant diameter, a deep plane 32 which is substantially perpendicular to the cylindrical surface 30, and an annular projection 34 which is formed between the deep plane 32 and the through hole 12 and which protrudes toward the tube 20 by a predetermined length. In this embodiment, the cylindrical surface 30 is formed to be substantially parallel to the direction of the axis B of the opening 24.

The insert bush 26 comprises an insert section 36 which expands in the outer circumferential direction to form an annular configuration having a ridge-shaped cross section and which is inserted into a hole of the tube 20 at one end, and an annular expanded section 38 which is formed integrally with the insert section 36 and which protrudes from the one end of the tube 20. An annular step 40, which abuts against the end edge of the tube 20, is formed at a boundary between the insert section 36 and the expanded section 38. The expanded section 38 is provided with an annular recess 42 for receiving the annular projection 34 of the joint body 16. Therefore, the annular recess 42 has its cross-sectional configuration which corresponds to a cross-sectional configuration of the annular projection 34.

Figure 2:
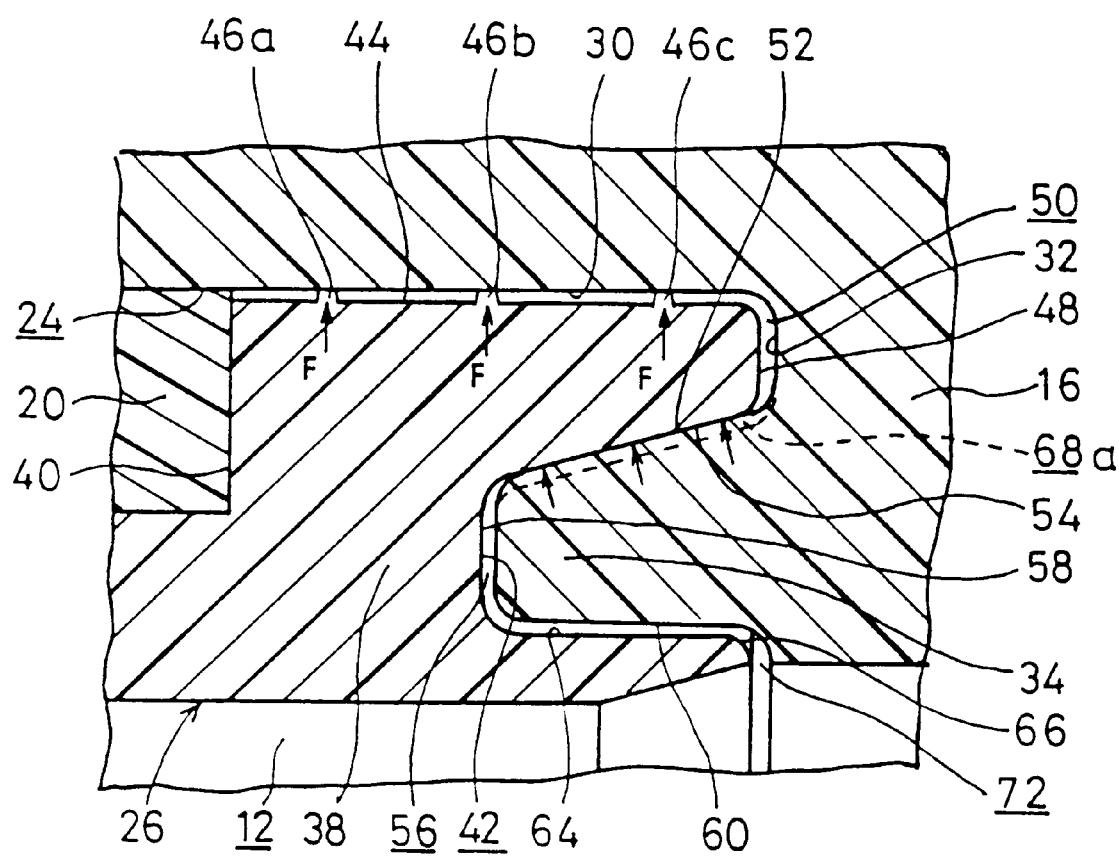
FIG. 2 shows a magnified view illustrating a portion A shown in FIG. 1.

As shown in FIG. 2, three stripes of first projections (annular projections) 46a to 46c, which are separated from each other by a predetermined spacing distance, are formed annularly on a first surface 44 which is the outer circumferential surface of the expanded section 38. Each of the first projections 46a to 46c is formed to have a trapezoidal cross section with its flat top surface 47 (see FIG. 3) which makes linear contact with the cylindrical surface 30 of the joint body 16.

Figure 3:
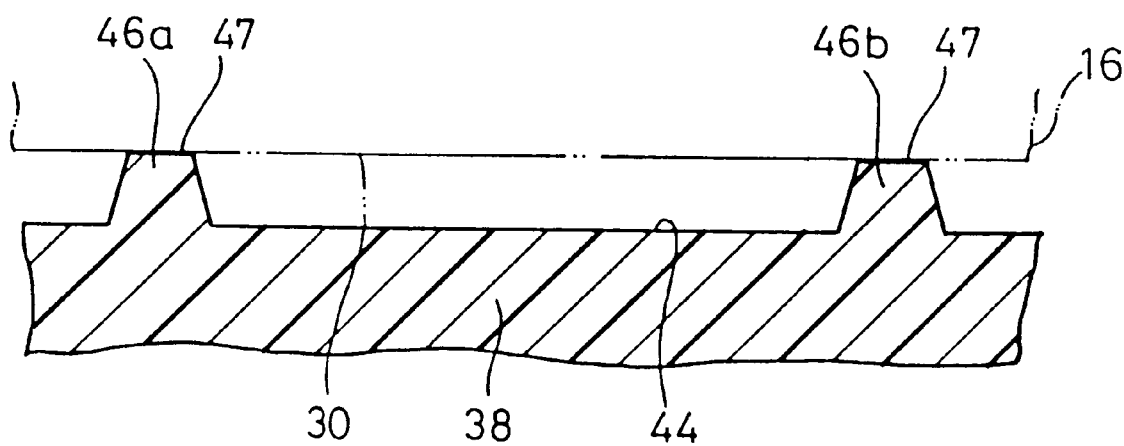
FIG. 3 shows a magnified view, with partial omission, of first projections shown in FIG. 2.

In this embodiment, the first surface 44 of the expanded section 38 is formed to be substantially parallel to the cylindrical surface 30 which is formed to be substantially parallel to the direction of the axis of the opening 24. In other words, the cylindrical surface 30 of the joint body 16 and the first surface 44 of the insert bush 26 are formed to be substantially parallel to the direction of the axis of the opening 24 respectively. Further, as seen in FIG. 3, the flat top surfaces 47 of the first projections 46a to 46c, which make linear contact with the cylindrical surface 30, are also formed to be substantially parallel to the direction of the axis.

As shown in FIG. 2, the expanded section 38 is formed with a second surface 48 which is in a noncontact state with respect to the deep plane 32 of the joint body 16. A first clearance 50 is formed between the second surface 48 of the expanded section 38 and the deep plane 32 of the joint body 16.

The annular recess 42 of the expanded section 38 comprises a third surface 54 which is inclined from the second surface 48 by a predetermined angle and which abuts against an inclined surface 52 of the annular projection 34 of the joint body 16, a fourth surface 58 which extends from the third surface 54 and which forms a second clearance 56 between itself and the top of the annular projection 34, a fifth surface 64 which is formed in a noncontact state with respect to a wall surface 60 of the annular projection 34 and which is formed to be substantially parallel to the direction of the axis B of the opening 24, and a sixth surface 66 which continues from the fifth surface 64 and which forms the end edge portion. A third clearance 72 is formed between the sixth surface 66 of the expanded section 38 and a bottom edge of the annular projection 34.

Therefore, the first surface 44 formed at the outer circumferential portion of the expanded section 38, the top surfaces of the first projections 46a to 46c formed on the first surface 44, and the fifth surface 64 formed on the annular recess 42 of the expanded section 38 are disposed substantially in parallel to the direction of the axis of the opening 24 respectively. They are not disposed to cross the direction of the axis B in FIG. 1.

Figure 4:
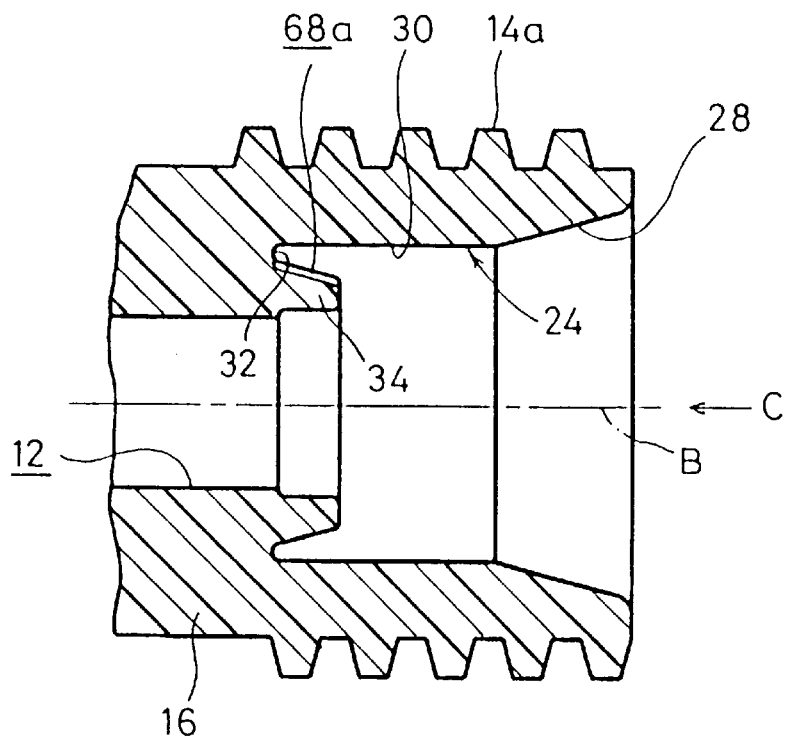
FIG. 4 shows a magnified view illustrating one end of the tube joint shown in FIG. 1.
Figure 5:
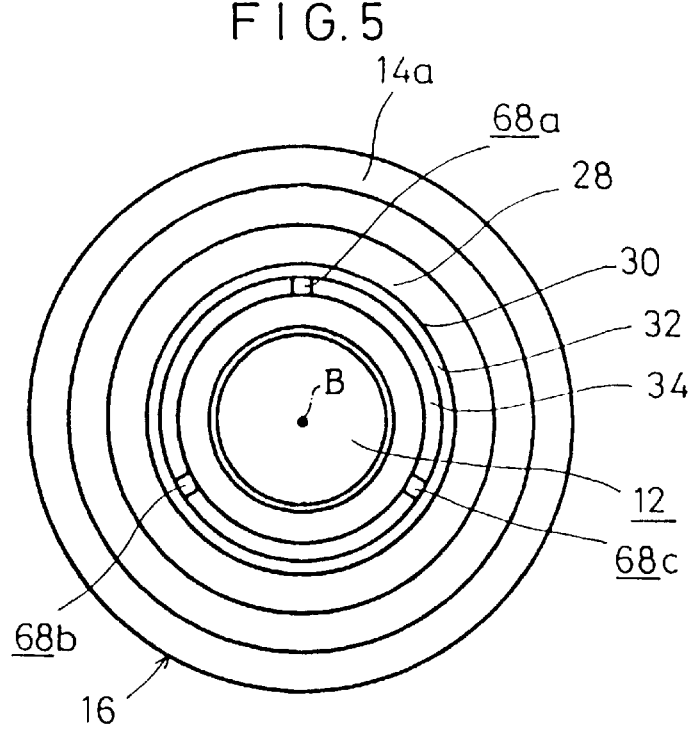
FIG. 5 shows a view as seen in a direction indicated by an arrow C shown in FIG. 4.

As shown in FIGS. 4 and 5, a plurality of grooves 68a to 68c for making communication between the first clearance 50 and the second clearance 56 of FIG. 2 are formed over the inclined surface 52 of the annular projection 34 provided in the joint body 16. The plurality of grooves 68a to 68c in FIGS. 4 and 5 are formed such that they are separated from each other by a predetermined angle and they extend radially along the radial direction.

As shown in FIG. 1, the nut member 22 is provided with a tube-pressing section 70 which is formed to be flexibly bendable in a direction indicated by an arrow D. The tube-pressing section 70 is bent flexibly in the direction of the arrow D by increasing the amount of screwing effected for the nut member 22. Thus, the tube 20 is interposed in a liquid-tight manner between the insert bush 26 and the tube-pressing section 70.

In this embodiment, it is preferable that the joint body 16, the nut member 22, and the insert bush 26 are formed of resin materials.

Figure 7:
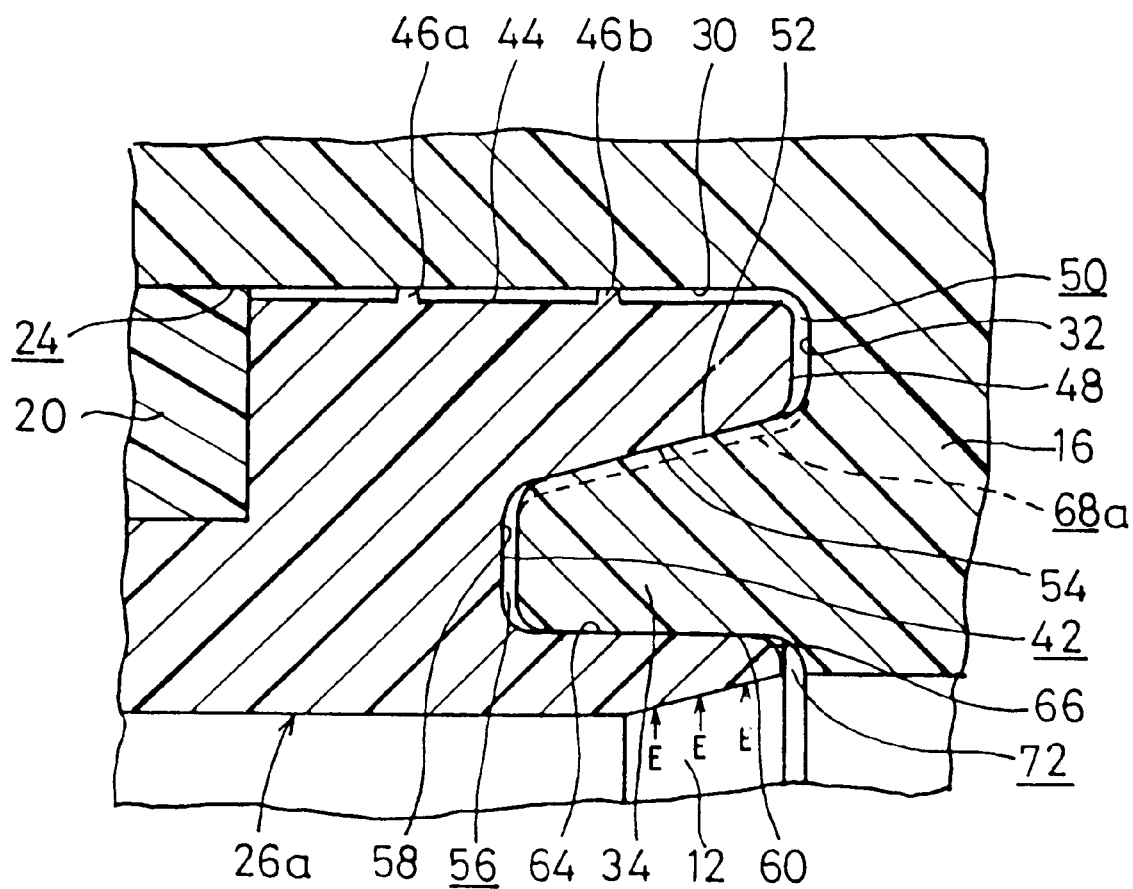
FIG. 7 shows a magnified view, with partial omission, illustrating a modified embodiment concerning the insert bush shown in FIG. 2.
Figure 8:
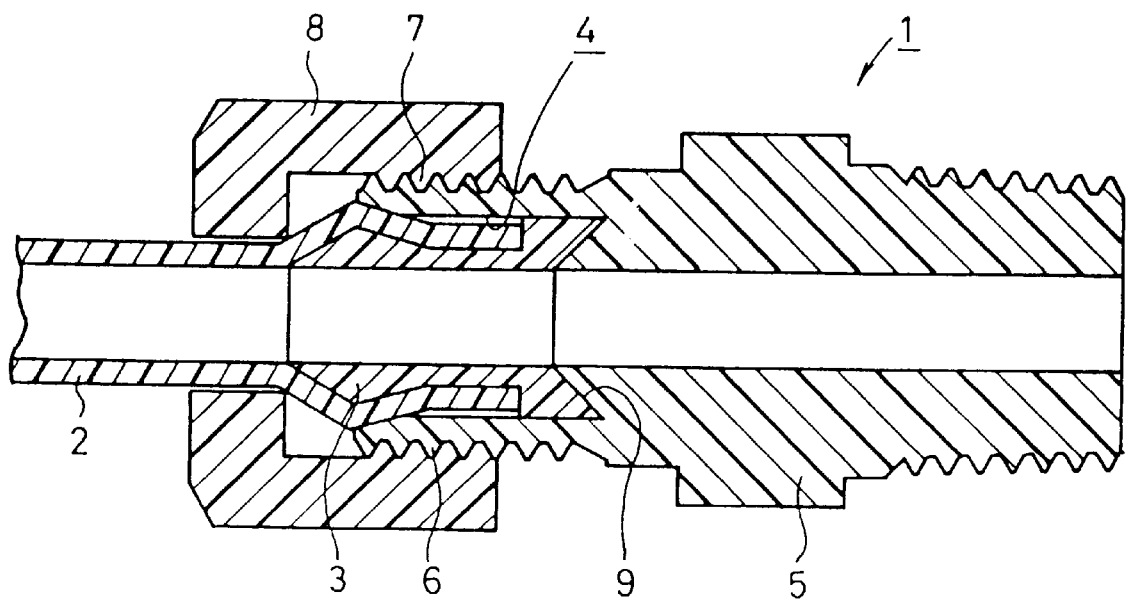
FIG. 8 shows a vertical cross-sectional view illustrating the tube joint concerning the conventional technique.

It is enough for the first projections 46a to 46c formed on the first surface of the insert bush 26 that they are provided as two or more individuals, i.e., as a plurality of individuals, without being limited to the three stripes (see FIG. 7).

Figure 6:
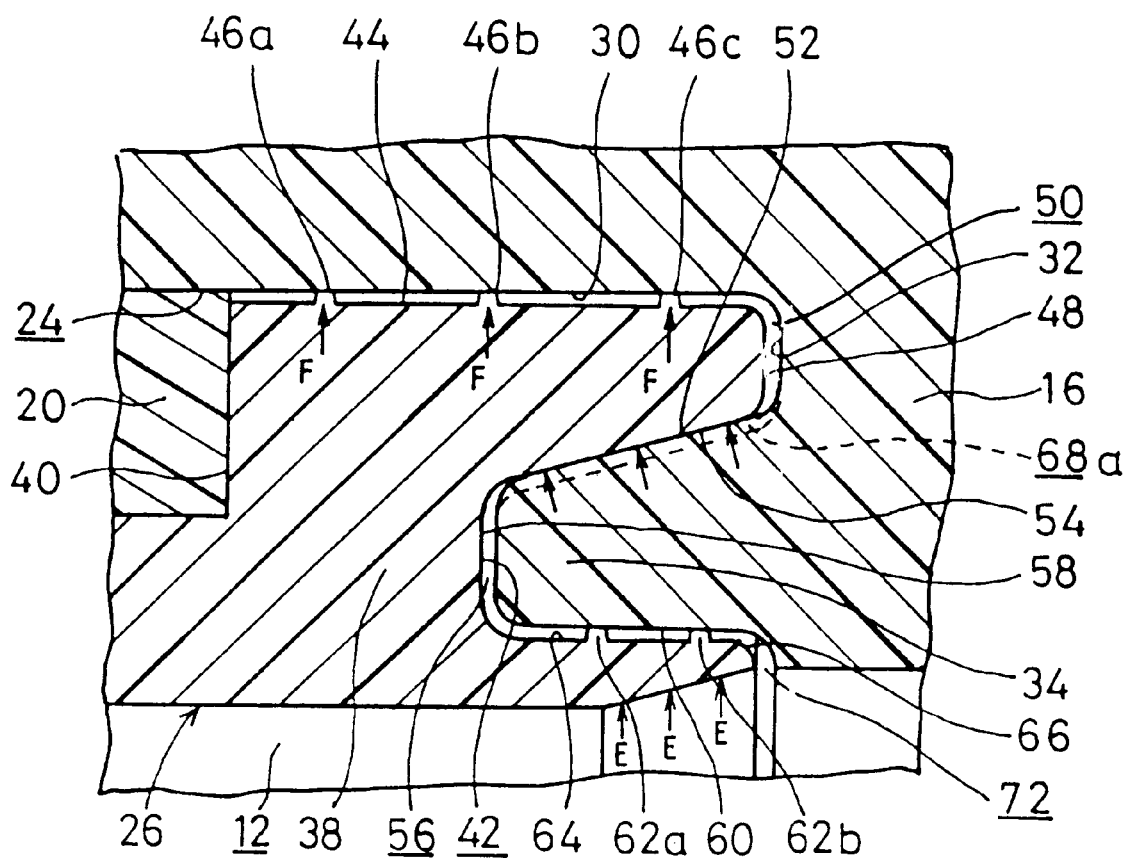
FIG. 6 shows a magnified view, with partial omission, illustrating a modified embodiment concerning an insert bush shown in FIG. 2.

As shown in FIG. 6, two stripes of second projections 62a, 62b, which are capable of making linear contact with the wall surface 60 of the annular projection 34 of the joint body 16, may be provided on the fifth surface 64 of the annular recess 42 of the insert bush 26. Alternatively, as shown in FIG. 7, an insert bush 26a may be used, which has the fifth surface 64 formed to be flat, without providing the second projections 62a, 62b of FIG. 6. As shown in FIGS. 6 and 7, any of the second projections 62a, 62b and the flat fifth surface 64 extends substantially in parallel to the direction of the axis of the opening 24.

In this embodiment as best shown in FIG. 6, the top surfaces of the second projections 62a, 62b of the annular recess 42 and the wall surface 60 of the annular projection 34 are in a noncontact state. The second projections 62a, 62b are pressed in a direction indicated by arrows E in accordance with the action of the pressurized fluid flowing through the through hole 12, and the second projections 62a, 62b linearly contact with the wall surface 60 of the annular projection 34. Thus, the annular recess 42 is prevented from invasion of the pressurized fluid thereinto (see FIGS. 6 and 7). Each of the second projections 62a, 62b is formed to have a trapezoidal cross section, in the same manner as the first projections 46a to 46c.

The tube joint 10 according to the embodiment of the present invention is basically constructed as described above. Next, its function and effect will be explained.

At first as seen in FIG. 1, the insert section 36 of the insert bush 26 is inserted and fitted to the hole at the one end of the tube 20. The insert bush 26 is pressed and inserted into the tube 20 until the annular step 40 abuts against the one end of the tube 20. As a result, the diameter of the one end of the tube 20 is enlarged along the shape of the insert section 36, and the inner circumferential surface of the tube 20 and the outer circumferential surface of the insert section 36 are held in a liquid-tight manner.

Subsequently, the one end of the tube 20, into which the insert bush 26 has been pressed and inserted, is inserted along the opening 24 of the joint body 16. The internal thread 18 of the nut member 22, which has been loosely fitted to the tube 20 previously, is screwed along the first external thread 14a of the joint body 16 so that the nut member 22 is tightened. Thus, the tube 20 is held in a liquid-tight manner in the opening 24 of the joint body 16.

in other words, the insert bush 26 is pressed integrally with the tube 20 toward the deep portion of the opening 24 of the joint body 16 by the aid of the tube-pressing section 70 by tightening the nut member 22. The tube 20 and the insert bush 26 are inserted until as seen in FIG. 2, the third surface 54 of the insert bush 26 abuts against the inclined surface 52 of the annular projection 34 of the joint body 16. In this embodiment, the inclined surface 52 of the annular projection 34 of the joint body 16 functions as a stopper for restricting the terminal end of the displacement portion of the insert bush 26.

Once the insert bush 26 arrives at the terminal end of the displacement portion by being pressed along the direction of the axis, the inclined surface, which forms the annular recess 42 of the insert bush 26, i.e., the third surface 54 is engaged with the inclined surface 52 of the annular projection 34 of the joint body 16, resulting in the state shown in FIG. 1. In this process, the tube-pressing section 70 is flexibly bent radially outwardly (in the direction of the arrow D) to correspond to the shape of the tube 20 having the enlarged diameter. The tube 20 is pressed toward the insert bush 26 by the force exerted by the tube-pressing section 70 to restore the original shape.

In the state shown in FIG. 1, the connecting portion between the joint body 16 and the tube 20 is held in a liquid-tight manner by the aid of a first seal section which functions as a seal by allowing the top surfaces of the first projections 46a to 46c of the insert bush 26 to make linear contact with the cylindrical surface 30 of the joint body 16, a second seal section which functions as a seal by pressing the tube 20 toward the insert bush 26 by means of the tapered surface 28 of the joint body 16, and a third seal section which functions as a seal by pressing the tube 20 toward the insert bush 26 by means of the tube-pressing section 70.

The first seal section sealed by the insert bush 26 is provided substantially in parallel to the direction of the axis B of the opening 24 of the joint body 16, which is not provided to cross the direction of the axis B. Therefore, in the present invention, it is unnecessary to consider any other conformation of the seal, and the structure is consequently simplified. Moreover, it is easy to attach and detach the insert bush 26, and the shape of a mold for production is also simplified.

As a result, the first, second, and third seal sections cooperate with each other, and thus the connecting portion between the joint body 16 and the tube 20 is held in a liquid-tight manner.

In this embodiment as best seen in FIG. 2, the second surface 48 of the expanded section 38 for constructing the insert bush 26 does not contact with the deep plane 32 of the opening 24. The first clearance 50 is formed between the second surface 48 and the deep plane 32. The fourth surface 58 of the expanded section 38 does not contact with the top of the annular projection 34. The second clearance 56 is formed between the fourth surface 58 and the top of the annular projection 34. The fifth surface 64 of the expanded section 38 and the wall surface 60 of the annular projection 34 are formed in the noncontact state. The third clearance 72 is formed between the sixth surface 66 of the expanded section 38 and the bottom edge of the annular projection 34. The third surface 54 of the insert bush 26 abuts against the inclined surface 52 of the annular projection 34. However, the first clearance 50 communicates with the second clearance 56 by the aid of the grooves 68a to 68c formed over the inclined surface 52. Therefore, the seal is effected only by the first projections 46a to 46c which make linear contact between the expanded section 38 of the insert bush 26 and the opening 24 of the joint body 16. The seal is not effected at any other portion. As a result, the sealing force of the first projections 46a to 46c per unit area is increased, while it is unnecessary to consider any seal structure at any other portion. Therefore, the structure is further simplified.

The force to press the third surface 54 in the direction of the arrow is exerted by the abutment of the inclined surface 52 of the annular projection 34 against the third surface 54 of the insert bush 26. The pressing force allows the force F (see FIG. 6) to press the first projections 46a to 46c toward the cylindrical surface 30 of the opening 24. As a result, the first projections 46a to 46c are pressed toward the cylindrical surface 30. Thus, the seal is reliably effected, and the sealing performance can be improved.

In the embodiment of the present invention, the seal portion between the insert bush 26 and the joint body 16 is formed to make linear contact without causing surface-to-surface contact. Accordingly, the contact area is decreased, and the force to press the seal portion in accordance with the action of the pressurized fluid, i.e., the surface pressure of the seal surface is increased. Thus, it is possible to improve the sealing performance more reliably.

In the embodiment of the present invention, the grooves 68a to 68c are provided over the inclined surface 52 of the annular projection 34 of the joint body 16. Accordingly, the contact area of the inclined surface 52 which abuts against the third surface 54 of the insert bush 26 can be reduced to decrease the contact resistance. Further, when the insert bush 26 is inserted, the pressurized fluid, which remains between the insert bush 26 and the opening 24 of the joint body 16, can be smoothly released through the grooves 68a to 68c.

What is claimed is:

1. A tube joint comprising:

a joint body having a through hole for being used as a fluid passage formed along an axial direction, and including a thread formed at least at one end;

a nut member for being engaged with said one end of said joint body through said thread to connect a tube member to said joint body; and an insert member for being inserted and fitted to an opening of said joint body, said insert member having an insert section to be inserted into said tube member and an expanded section protruding from one end of said tube member;

wherein said insert member has said expanded section formed by an outer circumferential surface which extends in parallel to said axial direction of said opening of said joint body, and a plurality of annular projections is formed on said outer circumferential surface along said axial direction of said opening, said annular projections being separated from each other by a predetermined spacing distance; and further wherein the annular projections provide respective seals which are pressed against an inner wall surface forming the opening of the joint body to make nonthreaded, pressed contact with the inner wall surface.

2. The tube joint according to claim 1, wherein said annular projections are formed annularly on a first surface as said outer circumferential surface of said expanded section, and said annular projections contact with a cylindrical surface as said inner wall surface of said joint body.

3. The tube joint according to claim 2, wherein said first surface of said expanded section and said cylindrical surface of said joint body are formed in parallel to said axial direction of said through hole respectively.

4. The tube joint according to claim 2, wherein said clearance includes a first clearance formed between a second surface as an end surface of said expanded section and a deep plane of said joint body, a second clearance formed between an annular recess of said expanded section and an annular projection of said joint body, and a third clearance formed between a sixth surface of said expanded section and a bottom edge of said annular projection.

5. The tube joint according to claim 1, wherein a clearance is formed between one end of said expanded section along said axial direction of said insert member and said opening of said joint body.

6. The tube joint according to claim 1, wherein an annular recess is formed at one end of said expanded section of said insert member, an annular projection corresponding to said annular recess is formed at said opening of said joint body, and a plurality of grooves, which expand radially, is formed over an inclined surface of said annular projection.

7. The tube joint according to claim 6, wherein a plurality of annular projections, which are separated from each other by a predetermined spacing distance and which extend in parallel to said axial direction of said opening, is formed on said annular recess of said insert member, and said annular projections contact a wall surface of said annular projection of said joint body so that said annular recess is prevented from invasion of a pressurized fluid flowing through said fluid passage thereinto.

\* \* \* \* \*